UNITED STATES PATENT OFFICE.

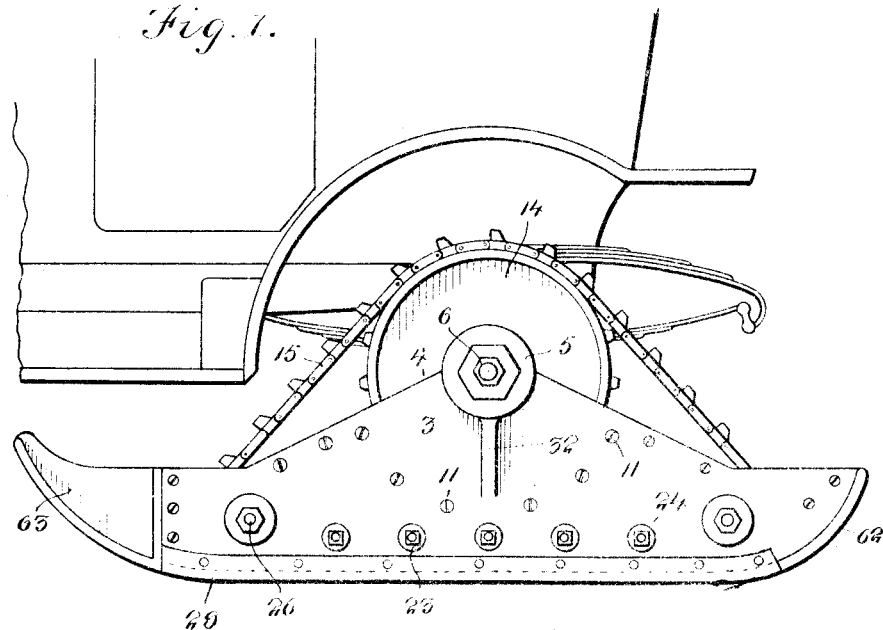

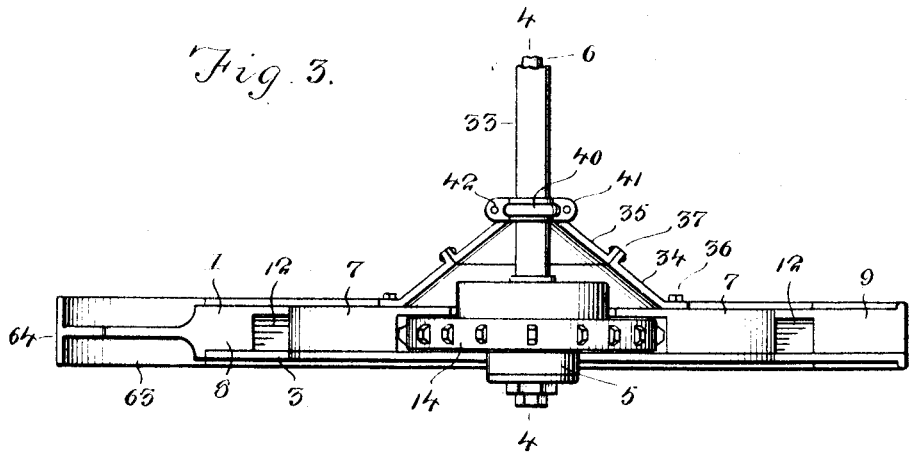
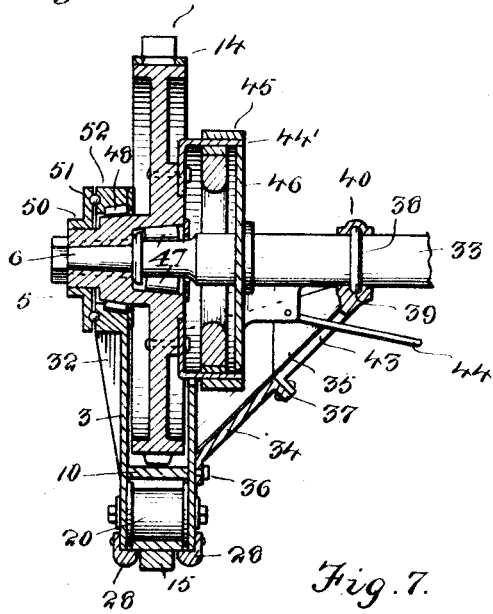
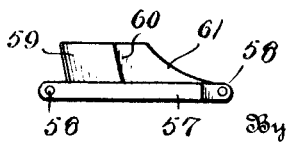

JOSEPH F. MONTINE, OF NEVINVILLE, IOWA.

SLEIGH ATTACHMENT FOR AUTOMOBILES.

1,132,862.   Specification of Letters Patent.   Patented Mar. 23, 1915.

Application filed March 24, 1914. Serial No. 826,915.

*To all whom it may concern:*

Be it known that I, JOSEPH F. MONTINE, a citizen of the United States, residing at Nevinville, in the county of Adams and State of Iowa, have invented new and useful Improvements in Sleigh Attachments for Automobiles, of which the following is a specification.

This invention relates to sleigh attachments for automobiles, the object in view being to provide runners applicable to the axles of an automobile in place of the usual wheels, each of said runners being equipped with driving means actuated by the driving mechanism of the automobile.

With the above and other objects in view, the invention consists in the novel construction, combination and arrangement of parts, as will be hereinafter more fully described, illustrated and claimed.

In the accompanying drawings:—Figure 1 is a side elevation of the rear part of an automobile showing one of the rear runners and its driving mechanism applied thereto. Fig. 2 is a vertical longitudinal section through one of the rear runners. Fig. 3 is a plan view of the same showing parts of the rear axle and its housing. Fig. 4 is a vertical diametrical section through the same on the line 4—4 of Fig. 3. Fig. 5 is an enlarged detail vertical section on the line 5—5 of Fig. 2. Fig. 6 is a detail plan view of one of the teeth of the driving sprocket chain. Fig. 7 is a side elevation of the same.

Each of the runners is of sectional construction, embodying a main section 1 of sufficient width as shown in Fig. 2 to provide for the formation in one side thereof of a large recess 2 of sufficient size to receive the working parts of the driving mechanism, and a detachable section 3 in the form of a plate adapted to form a closure for the open side of the main section 1, said plate serving to house in the mechanism hereinafter described in detail.

The central portion of the runner is raised or arched as shown at 4 to give the desired elevation for the bearing 5 which receives the adjacent end of the axle 6 of the automobile after the usual automobile wheel has been removed therefrom and as clearly illustrated in Figs. 1 and 4. The main section 1 is provided with a marginal flange 7 extending along the top edge thereof, front and rear flanges 8 and 9, and bottom cross bars or webs 10, the detachable section or plate 3 being secured to all of said flanges 7, 8, 9 and 10 by means of screws or other fasteners indicated at 11 in Fig. 1. In this way the internal recess within the sectional runner is closed with the exception of a pair of openings 12 for the driving sprocket chain hereinafter described and a concaved or segmental recess 13 to receive the lower portion of the driving sprocket wheel hereinafter referred to.

The main driving sprocket wheel indicated at 14 is keyed or otherwise fastened to the driving axle 6 so as to be rotated thereby and passing over said sprocket wheel 14 is a driving sprocket chain 15 the opposite runs of which extend downwardly at reverse angles as shown in Figs. 1 and 2 and pass around a front guiding sprocket wheel 16 and a rear guiding sprocket wheel 17, the last named sprocket wheel being journaled on shafts 18 and 19 in the front and rear ends of the recess 2 as clearly shown in Fig. 2 and at a sufficiently low point to enable the teeth of the bottom run of the chain to engage the surface on which the runner is supported for the purpose of propelling the runner either in a forward or backward direction.

Between the front and rear sprocket wheels 16 and 17 is a horizontal series of presser rollers 20 the function of which is to hold down the bottom run of the chain so as to keep the teeth thereof in engagement with the road surface. These rollers are journaled on tubular shafts 21 having their opposite ends reduced and fitted in openings 22 in the opposite sides of the runner body as best illustrated in the detail section Fig. 5. The said tubular shaft 21 is adapted to receive any suitable lubricating material which is retained therein by end plugs 23 and 24 screwed into the ends of said tubular shaft, one of said plugs 23 being centrally bored to form an oil hole 25 in connection with which a threaded plug 26 is employed to prevent the escape of lubricating material after it has been introduced into the tubular shaft 21. Said shaft 21 is formed with one or more discharge holes 27 to allow the lubricant to pass to the inside of the roller 20 thereby keeping said roller and the shaft 21 constantly lubricated.

In connection with each side section of the runner body, I employ a shoe 28 having a convex or rounded working face as shown in Fig. 5 and formed with a flange 29 adapting said shoe to be fastened to the runner body by means of suitable fasteners 30. By this means the shoes 28 when too far worn may be removed and new shoes may be substituted therefor. If desired, the sprocket wheel 14 may be provided with an antifriction bearing 31 on the axle 6 as shown in Fig. 2 to reduce friction to a minimum. On its outer side the said plate or detachable section 3 is braced relatively to the bearing 5 by means of a vertical reinforcing web 32 and at its inner side, the runner is braced relatively to the rear axle housing 33 by means of a hollow concavo-convex brace embodying two sections 34 and 35, the section 34 being fixedly secured at 36 to the main inner section 1 of the runner body and the section 35 together with the section 34 being flanged as indicated at 37 to enable the two sections of the bracing extension to be separated and fastened together in applying the runner to the axle and removing the same therefrom.

In order to allow the runner as a whole to oscillate on the axle 6 and yet prevent the same from sliding longitudinally of the axle housing 33, the said housing is provided at a suitable point with the stop rib 38 extending partly or wholly around the same while the section 35 of the bracing extension is grooved as shown at 39 to receive the rib 38. The section 35 is further provided with a detachable cap piece 40 which together with the section 35 is flanged as indicated at 41 and formed with holes 42 to receive clamping bolts. The section 35 is furthermore formed with a slot 43 to enable it to slip over the adjacent truss rod 44 of the whole axle housing as shown in Fig. 4, the section 35 being applied to the axle at some distance from the runner and then slid over the truss rod 44 until the flanges 37 are brought together to receive the fastening bolts.

Secured in fixed relation to the inner side of the main section 1 of the runner is a brake drum 44' around which operates a brake band 45, the inner open side of the drum 44' being closed by a housing plate 46 on the rear axle housing 33.

47 and 48 designate roller bearings for the sprocket wheel 14 and driving axle 6, and 50, a cap fast on the hub of the sprocket wheel 14 and associated by an end thrust bearing 51 with a collar 52 which is supported by the rollers 48, the latter bearing against the hub of the sprocket wheel 14 as shown in Fig. 4.

The preferred form of tooth for the driving chain 15 is illustrated in Figs. 6 and 7 wherein it will be observed that each tooth comprises a base or connecting link portion 57 having holes 58 at its opposite ends for the connecting pivots, the tooth comprising forwardly converging main working faces 59, transverse rear faces 60 adapted to grip the road surface when the driving mechanism is reversed for propelling the machine rearwardly, and a V-shaped reinforcing rib 61 which tapers from the highest portion of the tooth down to the plane of the base 57. The construction of tooth just described provides for the same automatically shedding the snow and ice preventing the same from banking against the working face of the tooth and this is true whether the chain is being driven in a forward or backward direction. Each runner is curved upwardly at both its front and rear ends, 62 designating the upwardly curving rear end of each runner while the front end of each runner is formed by a nose piece 63 curving upwardly toward the point 64 and being substantially in the form of an inverted T in cross section as indicated in Fig. 3 thus giving a broad bearing or working face which will prevent the point of the runner from becoming caught in the road surface.

The runners hereinabove described may be easily and quickly applied to the front and rear axles of an automobile or similar vehicle after the removal of the usual wheels and it will be apparent that the chains 15 are actuated by the usual driving mechanism which imparts motion to the driving axles of the motor vehicle. These chains may be driven in a forward or backward direction so as to propel the vehicle accordingly and the front runners, being mounted on the steering knuckles of the front axle, are used for steering the machine when used as a sleigh, said knuckles being controlled by the usual automobile steering mechanism.

What I claim is:—

A sleigh runner attachment for wheeled motor vehicles comprising a main runner body section formed with a recess in one side thereof, driving mechanism inclosed by said runner, a bracing extension projecting laterally from the main runner section and concavo-convex in cross section, said extension embodying separable sections flanged and bolted together, one of said sections being flanged and fastened to said runner section, an annular bead on the housing of the vehicle driving axle, and means for securing said bracing extension to said housing, said housing being formed with a groove to receive said bead to prevent movement of the runner lengthwise of said housing while permitting the runner to oscillate around said housing.

In testimony whereof I affix my signature in presence of two witnesses.

JOSEPH F. MONTINE.

Witnesses:
 GUY HEFLEN,
 JAMES KOSAR.